Patented Mar. 13, 1951

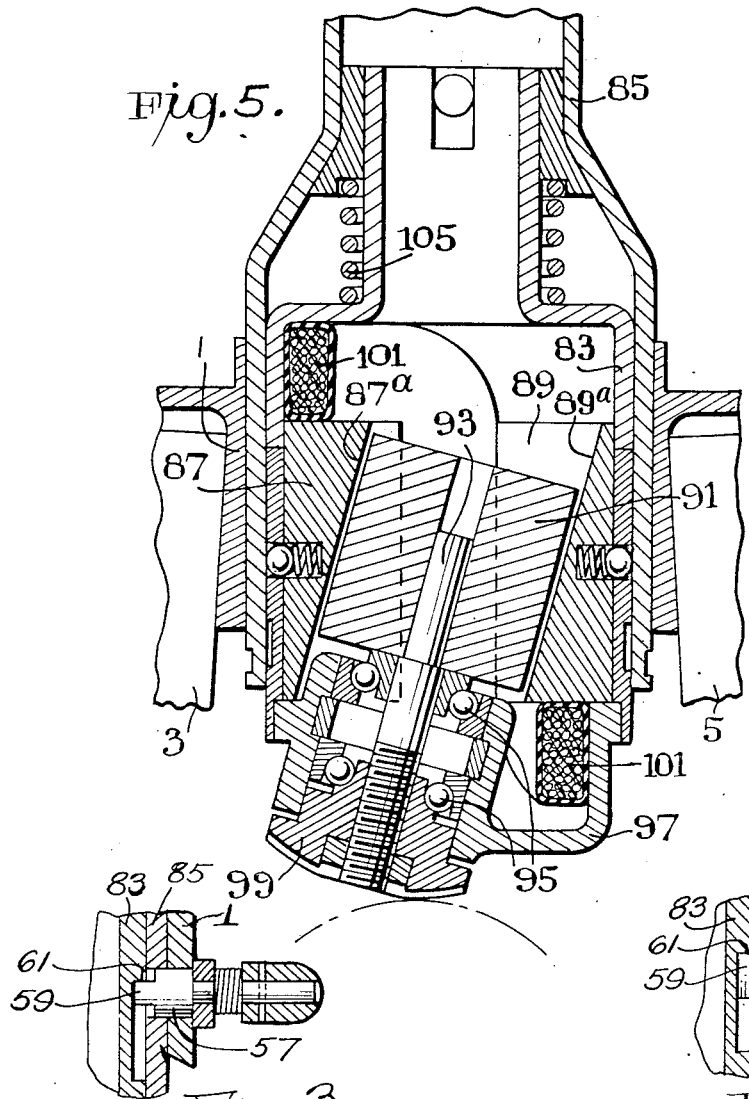

2,544,872

UNITED STATES PATENT OFFICE 2,544,872

CYCLE AND TO ELECTRIC GENERATOR FOR USE THEREWITH

Albert Edward Wood, South Yardley, Birmingham, and Rudolf Goldschmidt, Eckington, Sheffield, England, assignors to The Birmingham Small Arms Company Limited, Birmingham, England, a British company Application April 26, 1948, Serial No. 23,318
In Great Britain May 3, 1947

4 Claims. (Cl. 171—209)

This invention relates to cycles and like velocipedes which are fitted with electric generators, usually referred to as dynamos, for the purpose of lighting the lamps of the cycle.

There are at present two main types of such dynamos in use, one type being driven by a friction wheel which is adapted to be brought into contact with the tire of the wheel when required and usually referred to as a tire-driven dynamo, and the other type having the dynamo mounted inside the hub of the cycle wheel and usually referred to as a hub dynamo.

Each type has certain disadvantages, for example, the tire-driven dynamo is usually fitted to the rear or front fork of the cycle and is an extraneous fitting requiring brackets for securing it to the cycle, and in the majority of cases the rider has to dismount when it is desired to move the dynamo into its operative position. The losses due to friction in this type are high compared with the hub dynamo where the additional friction caused by the incorporation of the hub dynamo is extremely small, although there are certain losses arising from magnetic drag between the permanent magnet and the armature. The frequency of the current generated by the tire-driven dynamo is however invariably higher than that of the hub dynamo, thereby giving a more constant illumination from the lamps even when the cycle is propelled at low speed.

It is an object of the present invention to provide a cycle or the like with a tire-driven dynamo or generator which is fitted in such a manner that it involves little change in the appearance of the cycle, projecting parts from the cycle frame are reduced to a minimum and it may readily be moved into operative position by the rider without dismounting.

According to this invention a tire-driven dynamo or electric generator is incorporated in the steering stem of a cycle or the like.

According to a further feature of this invention a tire-driven dynamo or electric generator is incorporated in the steering stem of the machine and comprises a rotatable magnet in association with a fixed armature the magnetic yoke of which comprises the steering stem of the machine.

In order that the invention may be clearly understood two embodiments thereof will now be described with reference to the accompanying drawings, where Figure 1 is a sectional front elevation showing on an enlarged scale, one construction of tire-driven electric generator and drive arrangement;

Figure 3 is a fragmentary view showing means to enable the generator to move into and out of engagement with the tire;

Figure 4 is a view similar to Figure 3, but showing said means in another position; and Figure 5 is a sectional front elevation showing on an enlarged scale the second embodiment of the invention.

Figure 1:
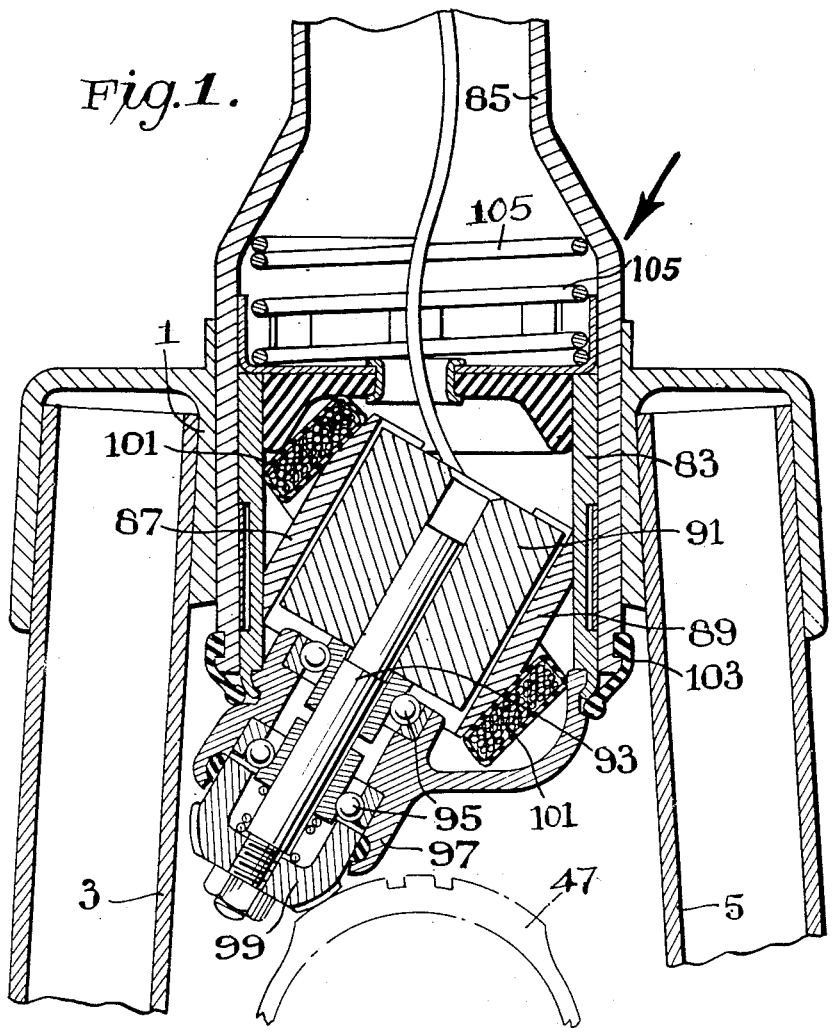

In the construction shown in Figure 1, a conventional form of bicycle steering stem assembly is employed comprising a fork crown 1 having secured thereto the usual fork stays 3, 5, and a steering stem 85 adapted to be rotatably mounted in the head tube of a cycle frame (not shown).

Figure 2:
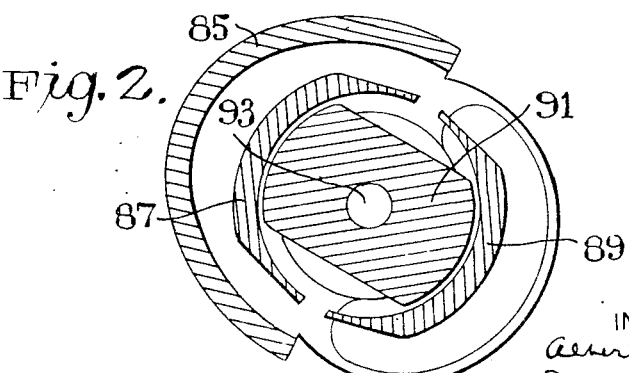
Figure 2 is a cross-sectional view looking in the direction of the arrow, Figure 1.

The lower end of the steering stem is enlarged to accommodate in a slidable manner a yoke tube 83 constituting a casing which is prevented from rotation in the stem by a pin and slot engagement (not shown). The yoke tube has formed thereon or fitted thereto two diametrically opposed pole shoes 87, 89. The faces of these pole shoes are of an arcuate formation, as seen in Figure 2, and are arranged at an angle to the axis of the steering stem and yoke-tube. This angle corresponds to the axis of the magnet 91, the spindle 93 of which is mounted in ball races 95 located in a cover member 97 attached to the end of the yoke-tube 83. On the end of the spindle 93 is mounted a driving wheel 99 adapted to be urged by the spring 105 into contact with the tire of the road wheel, and in order to secure an effective drive the periphery of the driving wheel may be bevelled to an angle which ensures a good surface contact between the wheel and the tire.

Around each pole shoe 87 and 89 is wound an armature coil 101 shaped to conform to the internal shape of the yoke-tube 83 and cover 97, which latter are sealed to the steering stem 85 against the ingress of dust or dirt by a washer 103 of rubber or other suitable material.

For the purpose of rendering the generator inoperative, means is provided for raising the device against the action of a spring 105, which in one convenient arrangement consists of a lifting catch extending through the steering stem 85 and fork crown 1 as shown in Figures 3 and 4. This catch comprises a stud 57 on the end of which is formed a cam 59 adapted to engage with a shoulder 61 on the casing 83. In one position of the catch, as seen in Figure 3, the flat of the cam face allows the spring 105 to impart a downward thrust on the casing 83 to bring the friction wheel 99 into operative contact with the tire 47. When however the catch is turned to the position shown in Figure 4, an end of the cam 59 imparts a lifting movement to the casing against the thrust of the spring 105 by its contact with the shoulder 61, thereby moving the friction wheel 99 clear of engagement with the tire 47 and so rendering the generator inoperative.

In the embodiment shown in Figure 5, the drive from the tire of the road wheel for imparting rotary movement to the magnet is substantially the same as that shown and described with reference to Figure 1, but the obliquity of the magnet spindle has been reduced in order to provide room for placing the armature coil crosswise around the magnet and the tips of the pole shoes for the purpose of reducing the amount of magnetic leakage. This modified arrangement also embodies certain structural improvements.

Referring to Figure 5 in which like parts to those shown in Figure 1 have been given the same reference numerals, the yoke-tube 83 constitutes a cylinder slidably mounted in the enlarged end of the steering stem 85, and on the inner surface of said yoke-tube are formed or fitted two diametrically opposed pole shoes 87, 89. These pole shoes are arranged in the form of projections and have faces 87a, 89a of arcuate formation the angle of which is co-axial with the axis of the magnet 91, the spindle 93 being mounted in bearings in the manner described with reference to Figure 1.

The armature comprises a coil 101 conforming to the internal shape of the yoke-tube 83, said coil surrounding the magnet 91 and being so shaped that it passes behind the projections of the pole shoes 87, 89, that is, behind the surfaces remote from the magnet, whereby the coil is interlinked with practically the whole magnetic flux emanating from the magnet. This has the effect of reducing magnetic leakage by interlinking practically the whole magnetic flux emanating from the magnet so that every pulsation of the flux due to rotation of the magnet exercises an inductive effect upon the coil.

As with the generator arrangement previously described, provision is made through the medium of a spring 105 to maintain the driving wheel 99 in contact with the tire when the generator is in operation, in conjunction with a lifting catch such as illustrated in Figures 3 and 4 for the purpose of rendering the generator inoperative.

It will be readily understood that the armature of the generators according to any of the constructions hereinbefore described and illustrated may comprise more than one coil, i. e. separate coils may be wound around each pole shoe, and that various mechanical features associated with the structure of a generator adapted to be mounted in the steering stem of a cycle could be modified without departing from the scope of the invention.

Having thus described our invention, what we claim as new and desire to secure by Letters Patent is:

1. A tire-driven electric generator for cycles incorporated in the steering head of the machine, comprising a rotatable permanent magnet in association with a fixed armature the magnetic yoke of which comprises a tube mounted within the steering stem, and means for rotating said magnet through the road wheel tire, wherein the yoke-tube and an extension thereof constitute a casing for the generator and driving mechanism, said casing being slidably but non-rotatably mounted in the steering stem.

2. A tire-driven electric generator for cycles incorporated in the steering head of the machine, comprising a rotatable permanent magnet in association with a fixed armature the magnetic yoke of which comprises a tube mounted within the steering stem, means for rotating said magnet through the road wheel tire, a casing for the generator and driving mechanism slidably but non-rotatably mounted in the steering stem, a spring depressing said sliding casing for rendering the generator operative, and means for lifting the casing to render the generator inoperative.

3. A tire-driven electric generator for cycles incorporated in the steering head of the machine, comprising a rotatable permanent magnet in association with a fixed armature the magnetic yoke of which comprises a tube mounted within the steering stem, means for rotating said magnet through the road wheel tire, a casing for the generator and driving mechanism slidably but non-rotatably mounted in the steering stem, a spring depressing said sliding casing for rendering the generator operative, and means for lifting the casing to render the generator inoperative comprising a hand-operated catch mounted in the steering stem having a rotatable stud on the end of which is formed a cam engaging with a shoulder on the casing.

4. In a cycle, the combination of a ferromagnetic steering stem, a ferromagnetic yoke tube co-axial with the steering stem and supported in the lower end of the steering stem so as to be axially slidable but non-rotatable, a spindle rotatably supported obliquely to the axis of the steering stem and movable with the yoke tube, a friction wheel secured to the lower end of the spindle to engage and be driven by a tire of a road wheel of the cycle, a two-polar permanent magnet secured at the upper end of the spindle within the yoke tube, a pair of diametrically opposed pole shoes secured to the interior of the yoke tube, an armature coil which passes around the upper part of one pole shoe and around the lower part of the other pole shoe, spring means to urge the yoke tube downwardly so that the friction wheel bears on the tire, and means to hold the yoke tube in a lifted position in which the friction wheel is not in contact with the tire.

ALBERT EDWARD WOOD.
RUDOLF GOLDSCHMIDT.

REFERENCES CITED

The following references are of record in the file of this patent:

UNITED STATES PATENTS

| Number | Name | Date |
|---|---|---|
| 2,088,029 | McDermott | July 27, 1937 |
| 2,368,700 | Bilde | Feb. 6, 1945 |

FOREIGN PATENTS

| Number | Country | Date |
|---|---|---|
| 111,418 | Germany | June 25, 1900 |
| 604,508 | Germany | Oct. 22, 1934 |
| 215,208 | Switzerland | Sept. 1, 1940 |